(12) United States Patent
Lehmann

(10) Patent No.: US 7,687,111 B2
(45) Date of Patent: Mar. 30, 2010

(54) METHOD FOR STRUCTURING A SUBSTRATE SURFACE

(75) Inventor: Mirko Lehmann, Freiburg i. Br. (DE)

(73) Assignee: Micronas GmbH, Freiburg i.Br. (DE)

( * ) Notice: Subject to any disclaimer, the term of this patent is extended or adjusted under 35 U.S.C. 154(b) by 1090 days.

(21) Appl. No.: 10/564,172

(22) PCT Filed: Jun. 30, 2004

(86) PCT No.: PCT/EP2004/007073

§ 371 (c)(1),
(2), (4) Date: Jan. 10, 2006

(87) PCT Pub. No.: WO2005/007387

PCT Pub. Date: Jan. 27, 2005

(65) Prior Publication Data

US 2007/0105111 A1    May 10, 2007

(30) Foreign Application Priority Data

Jul. 11, 2003    (DE) ................................ 103 31 714

(51) Int. Cl.
*B05D 5/00*    (2006.01)
(52) U.S. Cl. ........................ 427/256; 427/171; 427/176; 427/177; 156/102; 156/164; 106/31.13
(58) Field of Classification Search ..................... 73/88; 71/63; 206/411
See application file for complete search history.

(56) References Cited

U.S. PATENT DOCUMENTS 2,286,569 A * 6/1942 Pollack ........................ 156/164

(Continued)

FOREIGN PATENT DOCUMENTS

DE    19604953 A1    8/1997

(Continued)

OTHER PUBLICATIONS

Stephanie Perichon et al., Stretchable gold conductors on elastomeric substrates, Article, Apr. 14, 2003, pp. 2404-2406, vol. 82, No. 15.

(Continued)

*Primary Examiner*—Frankie L Stinson
*Assistant Examiner*—Andrew Bowman
(74) *Attorney, Agent, or Firm*—The Webb Law Firm

(57) ABSTRACT

In a method for structuring the surface of a substrate, a substrate is elastically expanded by the application of a tensile stress so that a surface area of the substrate in which a structure is to be created, is enlarged. Then, in the surface area, a structure is produced that is larger than the structure to be produced. For this purpose at least one solution is applied to the substrate, which solvent contains at least one solid substance dissolved in a solvent. The solvent is then removed from the surface of the substrate so that the solid substance remains behind. The expansion of the substrate is at least partly reversed by the reduction or removal of the tensile stress so that the size of the structure is reduced to the size of the structure to be produced. In the material of the substrate, a compression stress can also be created to reduce the size of the structure to the size of the structure to be produced.

17 Claims, 4 Drawing Sheets

U.S. PATENT DOCUMENTS

| | | | | | |
|---|---|---|---|---|---|
| 3,618,754 | A | * | 11/1971 | Hoey | 206/411 |
| 5,395,419 | A | * | 3/1995 | Farone et al. | 71/63 |
| 2003/0196830 | A1 | | 10/2003 | Koskenmaki et al. | |

FOREIGN PATENT DOCUMENTS

| | | |
|---|---|---|
| DE | 19946252 A1 | 4/2001 |
| DE | 19959346 A1 | 6/2001 |

OTHER PUBLICATIONS

Ned Bowden et al., Nature, Article, May 1998, pp. 146-149, vol. 393.

M. Maghribi et al., $2^{nd}$ Annual International IEEE-EMBS Special Topic Conference, Stretchable Micro-Electrode Array, May 2002, pp. 80-83, Poster 149.

Hou-Pu Chou, et al., Proc. Solid-State Sensor and Actuator Workshop, Jun. 1998, pp. 11-14, Hilton Head, SC.

Deniz Armani, et al., PDMS Elastomer Micromachining, Re-Configurable Fluid Circuits, (1999) pp. 222-227, Urbana-Champaign, IL.

Mark L. Adams, et al., On-Chip Absorption and Fluorescence Spectroscopy with Polydimethylsiloxane (PDMS) Microfluidic Flow Channels, California Institute of Technology, CA, $2^{nd}$ Annual International IEEE-EMBS Special Topic Conference, May 2002, Madison, Wisconsin, pp. 369-373, Poster 190.

B.-N. Kim et al., Letters to Nature, Magazine, Sep. 2001, pp. 288-291, vol. 413, National Institute for Materials Science, Japan.

T. Vo-Dinh et al., DNA Biochip Using a Phototransistor Integrated Circuit, Magazine, vol. 71, No. 2, p. 358-363,. Jan. 1999, Analytical Chemistry.

Eung Ju Oh et al., Electrochemical Synthesis and Characterization of Stretchable Polypyrrole Films, Molecular Crystals and Liquid Crystals, 2001, vol. 371, pp. 243-245, Myongji University, Korea.

Akol, Y., et al., Current Progress in Synthesis of Polyacetylene Films, Article, Synthetic Metals, vol. 84, No. 1-3, pp. 307-310, Jan. 1, 1997, University of Tsukuba, Japan.

* cited by examiner

METHOD FOR STRUCTURING A SUBSTRATE SURFACE

BACKGROUND OF THE INVENTION

1. Field of the Invention

This invention relates to a method for structuring the surface of a substrate, whereby the substrate is prepared and then the structure is produced on a surface area of the substrate by applying at least one solution to the surface area, which solution contains at least one solid substance dissolved in a solvent, whereby the solvent is removed from the surface of the substrate so that the solid substance remains behind.

2. Description of the Prior Art

A similar method of the prior art for the manufacture of a biochip is described in T. Vo-Dinh et al., "DNA Biochip Using a Phototransistor Integrated Circuit," Analytical Chemistry, Volume 71, No. 2,p. 358 ff. (Jan. 15, 1999). In that case, first a microarray is created by applying, on a nitrocellulose membrane that functions as the substrate, a structure that has a matrix with a plurality of fields in which different biological receptors are located. For the manufacture of the micro array, the receptors are deposited on the substrate in liquid form by means of a capillary needle that is connected with a pico pump. The capillary needle has a capillary diameter of approximately 100 μm, so that the structure size of the fields that can be applied to the substrate by means of the capillary model lies in the range of approximately 100 μm. The micro array is used for the qualitative and/or quantitative detection of the presence of certain ligands in a sample to be analyzed. The receptors of the individual areas differ from one another in their specificity for a determined ligand to be detected. It is thereby possible to use the micro array to test the sample for the presence of a plurality of different ligands simultaneously. For the detection of a ligand that is contained in the sample, the sample is placed in contact with the receptors immobilized on the micro array. The receptor, which is specific for the ligand to be detected, thereby bonds to the ligands. The receptor-ligand complex formed can be detected by means of fluorescence. For the detection, the individual areas of the matrix that contain the receptors are irradiated with optical radiation which excites the receptor-ligand complexes to emit luminescent radiation. For the detection of the luminescent radiation, the micro array is positioned on the surface of a CCD sensor array so that the individual fields of the micro array each coincide with a photo cell of the CCD sensor array. One disadvantage of this arrangement, however, is that the fields of the matrix still have relatively large dimensions which—as noted above—are in the range of approximately 100 μm. However, the structure sizes of a typical CCD sensor array are only approximately 1 μm. Therefore if a micro array with 1000×1000 fields were positioned on a CCD sensor array, a chip surface of 100×100 mm would be required simply for the phototransistor array of the CCD sensor, which would make such a semiconductor chip very expensive and unprofitable.

DE 199 59 346 A1 describes a method in which the surface of a substrate is provided with a masking layer that is impermeable for a layer to be applied, and the substance is then introduced into areas of the substrate that are not covered by the masking layer. Then a heat treatment is performed, in which the substance is diffused into an area of the substrate covered by the masking layer. A concentration gradient of the substance is then formed, starting from the edge of the masking layer, with increasing distance inward from the edge in the area covered by the masking layer. Then the masking layer is removed to expose the substrate area underneath. Then a layer of the substrate close to the surface located in the exposed substrate area is converted by means of a chemical conversion reaction into a coating with a layer thickness profile that corresponds to the concentration gradient in the substance. Then the coating is placed in contact with an etching agent until in a partial area of the coating, the surface of which is smaller than the substrate area covered by the original masking layer and in which the thickness of the coating is reduced compared to the other areas, the substrate area covered by the partial area is exposed. After the coating in certain areas has been removed in this manner, in the exposed area of the surface a metal layer is electrically deposited, the dimensions of which are smaller than the dimensions of the original masking layer. In practice, this method has been found to be successful, in particular for the manufacture of small metal electrodes. One disadvantage of the method, however, is that it is relatively complex and time-consuming and that it is limited to certain substrate materials. In particular, the method is unsuitable in practice for the application of a structure that has biocomponents on the substrate.

Périchon, Lacour, Stéphanie et al., "Stretchable gold conductors on elastomeric substrates," Applied Physics Letters, Volume 82, No. 15, pages 2404-2406, also describes a method for the manufacture of a stretchable electrical conductor which has, on an elastic substrate, thin gold strips to which a compression stress is applied. For the application of the compression stress, the substrate is first pre-stretched. Then the gold strip conductors are deposited onto the substrate through a shadow mask. Then the expansion of the substrate is reversed and the electrical conductivity of the gold contact strips is tested. On the basis of this test, the authors come to the conclusion that it is possible to manufacture expandable electrical conductors for use in three-dimensional electronic circuits.

The object of the invention is to create a method of the type described above that makes it possible, in a simple manner, to produce a structure with reduced structure size on the substrate.

SUMMARY OF THE INVENTION

The invention teaches that the substrate is prepared and the material of the substrate is elastically expanded by the application of a tensile stress so that the surface area of the substrate to be structured increases, whereby at least one solution is then applied to the enlarged surface area that contains at least one solid material dissolved in a solvent, whereby the expansion is then at least partly reversed by the reduction or elimination of the tensile stress, such that the size of the structure is reduced to the size of the structure to be produced, whereby the solvent is removed from the surface of the substrate so that the solid matter remains behind.

The solvent can be removed from the surface of the substrate before, during and/or after the reduction or removal of the tensile stress from the surface of the substrate. However, the solvent is preferably removed after the reduction or removal of the tensile stress. This sequence of operations prevents mechanical stresses from being introduced into the structure and/or via the structure during the shrinkage process. The solution can be applied to the substrate by spraying, by means of a jet printer for example, or by printing using relief printing, intaglio or gravure printing and/or pad printing. The solid material can be or contain a water-soluble organic and/or inorganic chemical substance, of the type that is used in combinatorial chemistry, for example.

After the structure has been produced, the size of the structure is reduced by reducing or removing the tensile stress, so that the substrate contracts. The dimensions of the structure located on the substrate are thereby reduced. In this manner, the structure can be created in a size that is smaller than the smallest structure size that can be produced directly with the structuring method used for the production of the structure. The method makes it possible to adjust the size of structures that are created with technologies, the sizes of which do not match one another, so that the structures manufactured with these technologies can be combined with one another. The expansion that occurs in the substrate as a result of the tensile stress, i.e. the change in length of the substrate caused by the tensile stress divided by the dimension of the un-expanded substrate, can be at least 10%, optionally at least 50% and potentially at least 100%, particularly at least 200% and preferably at least 1000%.

The invention also teaches that the substrate is prepared and, on a surface area of the substrate which is enlarged with respect to a surface area to be provided with the structure, at least one solution is applied which contains at least one solid substance dissolved in a solvent, whereby the material of the substrate is elastically compressed b the application of a compression stress so that the size of the surface area on which the solution was applied is reduced to the size of the surface area to be provided with the structure, whereby the solvent is removed from the surface of the substrate so that the solid material remains behind.

The compression stress is preferably maintained permanently. In this manner, the structure can be produced in a size which is smaller than the smallest structural size that can be produced directly by the structuring process used to produce the structure. The solvent can be removed from the surface of the substrate before, during and/or after the application of a compression stress.

It is advantageous if the substrate is realized in the form of a board or film and if the material of the substrate is expanded by centered stretching in the plane of extension of the substrate radially with respect to a center that is preferably located approximately in the center of the substrate and/or compressed. As a result of this measure, it is possible to reduce the dimensions of the structure in its plane of extension in directions that run at right angles to each other, for example to reduce the dimensions two-dimensionally and in scale. For the production of the structure, it should be borne in mind that with the centered extension, the image representation is one in which the surface changes in a non-linear manner with respect to the expansion. There can also be an uneven expansion of the substrate if the tensile and/or compression stress is introduced into the substrate unevenly or asymmetrically. The structure which is enlarged with respect to the structure to be produced must then be produced in an appropriately distorted manner on the substrate to compensate for these irregularities.

In an additional embodiment of the method, the material of the substrate is expanded and/or compressed by one-dimensional stretching in the plane of extension of the substrate. Therefore the substrate is pulled lengthwise in one direction against the restoring force of its material or compressed. In this method, with a homogeneous substrate that has a constant thickness over its plane of extension, the variation of the surface scale over the substrate is constant.

In one advantageous embodiment of the invention, the solutions are applied to the surface area so that on the surface of the substrate a coating is formed that has a plurality of different coating areas that are located next to one another in a matrix. A coating of this type can be produced by printing the substrate with the solutions easily and economically on the substrate.

In one preferred realization of the invention, to produce the structure, at least one biomolecule is applied to the substrate which preferably bonds to said substrate. The biomolecule can be nucleic acids or derivatives thereof (DNA, RNA, PNA, LNA, oligonucleotides, plasmids, chromosomes), peptides, proteins (enzyme, protein, oligopeptide, cellular receptor proteins and complexes thereof, peptide hormones, antibodies and fragments thereof), carbohydrates and derivatives thereof, in particular glycolized proteins and glycosides, fats, fatty acids and/or lipids. Water is provided as the preferred solvent. The method makes it possible to immobilize such biomolecules on the surface of the substrate without the use of chemical substances. The biomolecule can be immobilized covalently or non-covalently. Because the substrate contracts after the reduction or removal of the tensile stress and/or during compression, the surface area on which the biomolecules are immobilized is reduced. Because the amount of the biomolecule remains constant, the intensity or concentration (number of particles per unit of surface area) of the biomolecule thereby increases.

It is advantageous if the substrate consists of an optically transparent material. The method can be used particularly well for the production of a structure for an optical sensor.

In one advantageous realization of the method, the substrate contains at least one elastomer, in particular polypyrrole, polyacetylene and/or polydimethylsiloxane (PDMS). Substrates of this type are described in Eung Ju Oh et al., Electrochemical synthesis and characterization of stretchable polypyrrole films, Molecular Crystals and Liquid Crystals, Volume 371,pp. 243 ff. (2001), Akol, Y., Current progress in synthesis of polyacetylene films, Synthetic Metals, Volume 84,No. 1-3,p. 307 ff. (Jan. 1, 1997) and Armani, Deniz et al., Reconfigurable Fluid Circuits by PDMS Elastomer Micromatching, 12th International Conference on MMS, MEMS 99,Orland (1998), pp. 222-227,and make possible a high elastic expansion or shrinking or compression.

It is particularly advantageous if, after the reduction or removal of the tensile stress and/or after the application of the compression stress, the substrate is applied to a detection device that is preferably integrated into a semiconductor chip so that the coating areas each cover at least one sensor of the detection device. With this method in particular biochips that have a plurality of fields arranged in a matrix and in which there are sensors covered by biomolecules, can be manufactured economically. In particular, valuable chip space can be saved on account of the dimension(s) of the structure(s) that are produced on the substrate and reduced by the shrinking process. Using this method, the distance between the coating areas or the biomolecules can be reduced by at least 10%, optionally by at least one-third, and potentially by at least one-half, in particular by at least two-thirds and preferably by at least 90%.

In one preferred embodiment of the method, the substrate contains a ceramic material, preferably tetragonal zirconium oxide, magnesium aluminum oxide spinel and/or alpha aluminum oxide, a ceramic material of this type is described in B.-N. Kim et al., A high-strain-rate superelastic ceramic, Nature, Volume 413,p. 288 (Sep. 20, 2001). The method can be therefore also be used to structure ceramic substrates, as a result of which the method can also be used in microsystems technology.

BRIEF DESCRIPTION OF THE DRAWINGS

One exemplary embodiment of the invention is explained in greater detail below with reference to the accompanying drawings, in which.

DETAILED DESCRIPTION OF THE PREFERRED EMBODIMENTS

Figure 1:
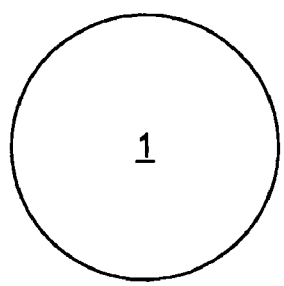
FIG. 1 is a plan view of a substrate formed by a plastic film.

In a method for the structuring of a surface, a substrate 1 in the approximate shape of a circular disc is prepared so that it is realized in the form of a thin elastomer film that extends in a plane that corresponds to the plane of the drawing in FIG. 1.

Figure 2:
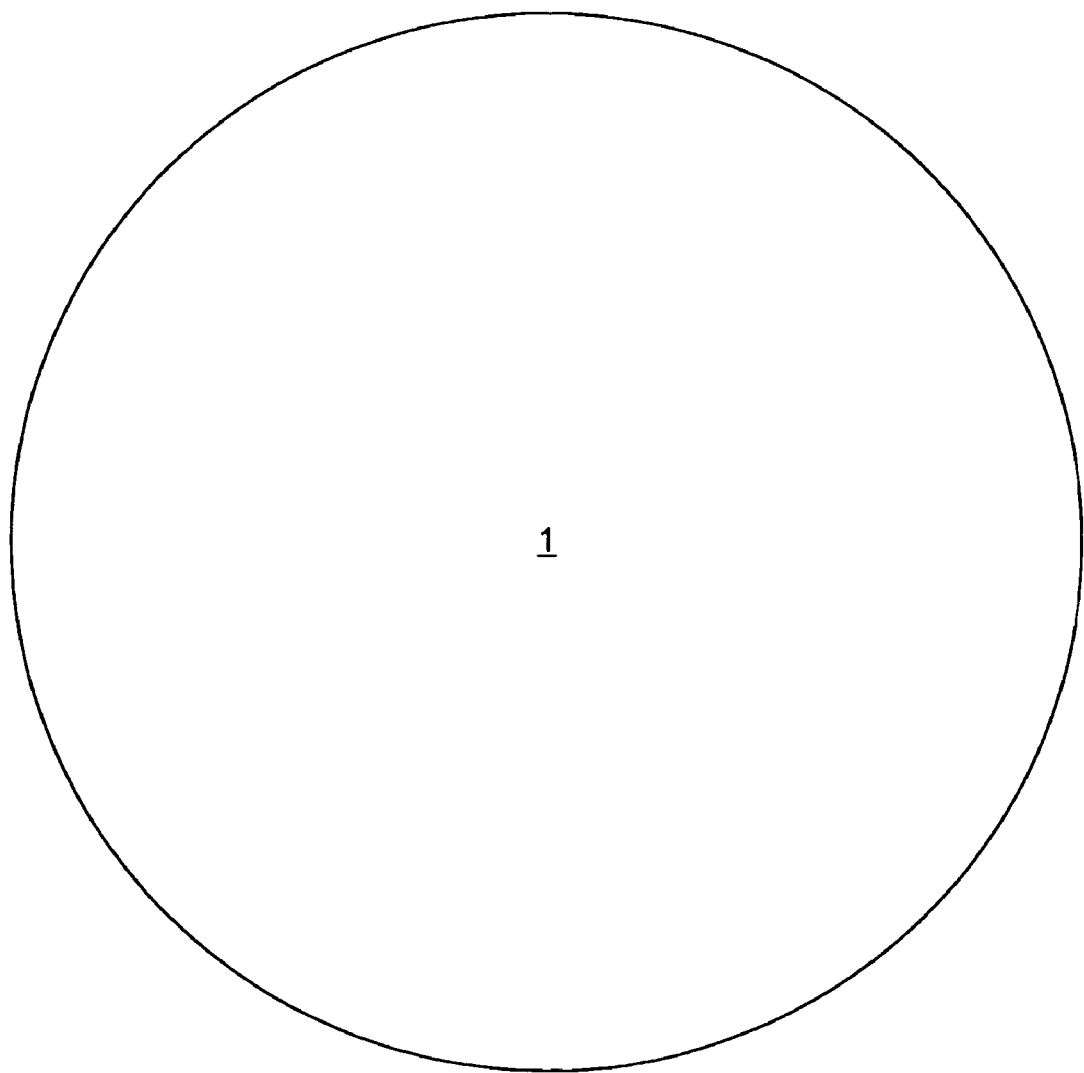
FIG. 2 is a plan view of the substrate after said substrate has been elastically expanded by centered stretching, FIG. 3 the substrate shown in FIG. 2, after a structure has been produced on its surface, FIG. 4 a plan view of the substrate that has the structure, after the substrate was reduced in size, opposite to the expansion, to its original dimensions shown in FIG. 1.

In a second step of the method, the substrate is elastically expanded in its plane of extension by centered stretching, whereby the center of the expansion is located approximately in the center point of the circular disc. For that purpose, the substrate 1 is first clamped in place at a plurality of fastening points on its outer edge that are preferably distributed uniformly over the periphery, so that the fastening points are displaced outward approximately radially with respect to the midpoint of the circular disc. In the substrate 1 a tensile stress is thereby produced which elastically deforms the elastomer film. A comparison of FIGS. 1 and 2 shows that the diameter of the substrate 1 after the expansion is approximately four times and the base area of the substrate equals approximately sixteen times the base area of the un-deformed substrate.

In a third step of the method, a structure is produced on the surface of the substrate 1. For this purpose, in a plurality of fields 2 arranged in a matrix pattern and separated from one another by spaces, different solutions are applied to the substrate 1 by means of a jet printer. The individual solutions each contain a solvent and at least one DNA molecule dissolved in it. The DNA molecule bonds to the surface of the substrate and forms a coated area.

Figure 3:
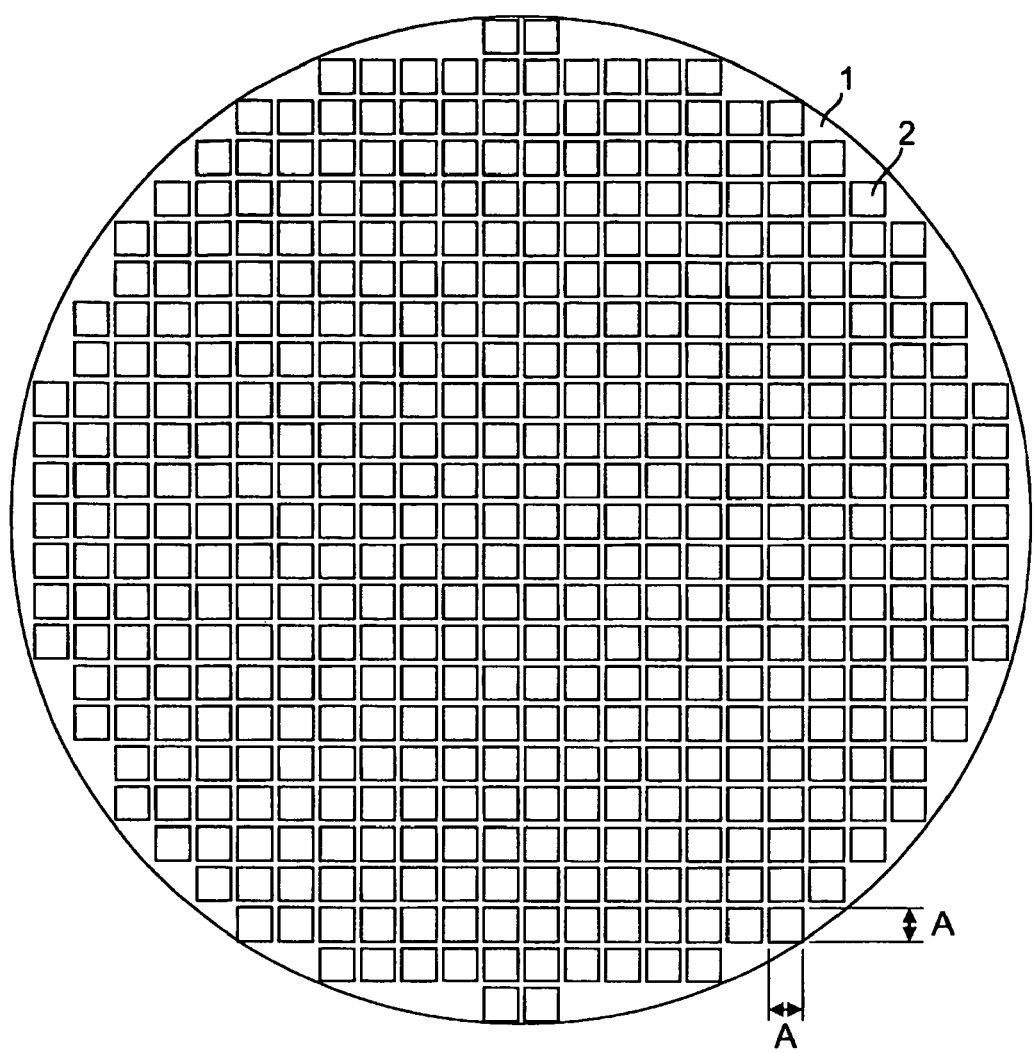
Figure 4:
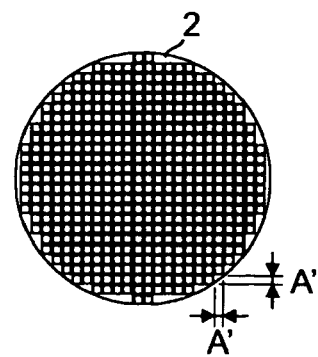

In a fourth step of the method, the tensile stress is removed, as a result of which the substrate 1 with the structure on it contracts on account of the restoring force of the elastic substrate material, opposite to the expansion, to approximately its original size. The fastening points at which the substrate is clamped are for this purpose moved back radially with respect to the center point of the circular disc to their original position. A comparison of FIGS. 3 and 4 shows that as a result of this contraction the dimension A, which the fields 2 of the structure have originally, is reduced to the dimension A', which equals approximately one-quarter of the dimension A. Now the solvent contained in the solutions is removed from the surface of the substrate, so that only the coated areas on the substrate 1 remain.

Figure 5:
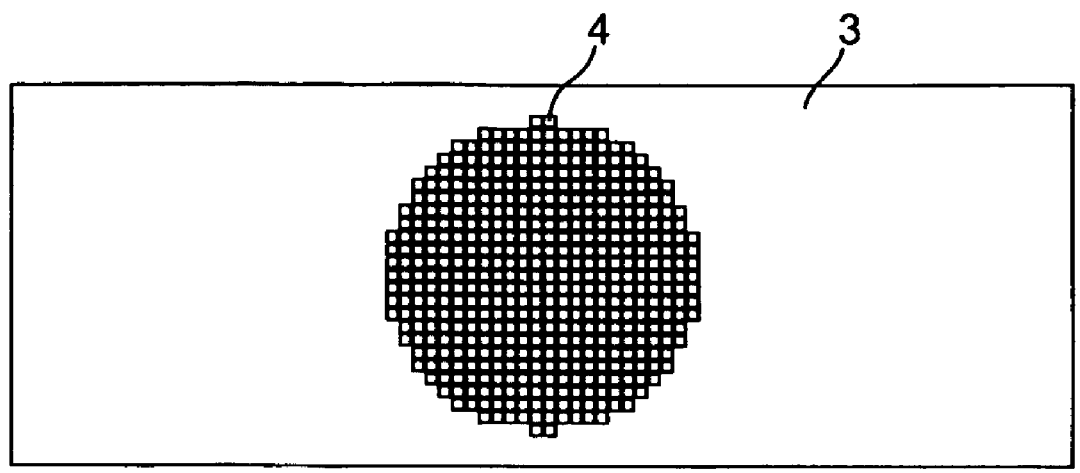
FIG. 5 is a plan view of a semiconductor chip into which an array with photocells has been integrated, FIG. 6 the semiconductor chip shown n FIG. 5 after coating with the substrate shown in FIG. 4 having the structure.
Figure 7:
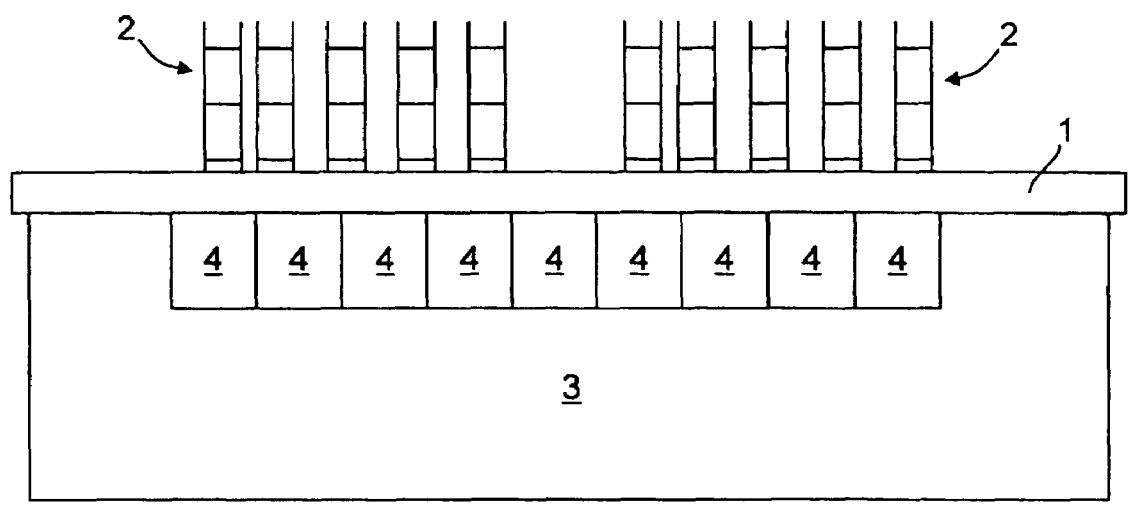
FIG. 7 is a cross section through a semiconductor chip on which the substrate having the structure is laid.

In a fifth step of the method illustrated in FIG. 5, a semiconductor chip 3 which is shown only schematically in the drawing is prepared, and in which a plurality of optical sensors 4 are integrated. As shown in FIG. 7, these sensors are located in an area of the semiconductor chip 3 located near the surface.

Figure 6:
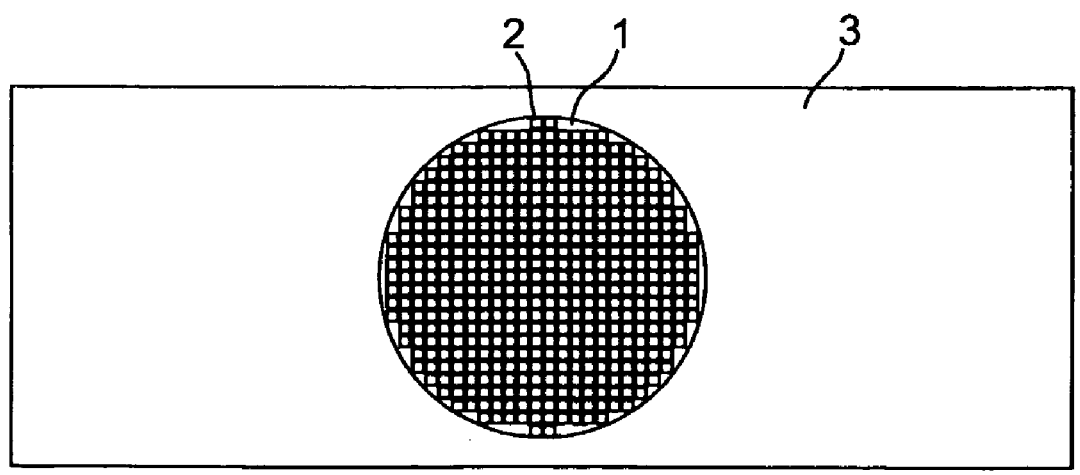

In a sixth step of the method, the back side of the substrate 1 that faces away from the structure is positioned on the surface of the semiconductor chip 3 so that the individual coating areas each cover at least one optical sensor 4 (FIGS. 6 and 7). The biosensor thus created can then be extrusion-coated, if necessary, with a plastic housing outside the structure that has the coated areas.

In the method for the structuring of the surface of a substrate 1, therefore, a prepared substrate 1 is elastically expanded by the application of a tensile stress so that a surface area of the substrate 1 in which a structure is to be produced becomes larger. Then, in the surface region, a structure is produced which is larger than a structure that is to be produced. Then the expansion of the substrate 1 is at least partly reversed by reducing or removing the tensile stress, so that the size of the structure 1 is reduced to the size of the structure 1 to be produced. A compression stress can also be produced in the material of the substrate 1 to reduce the size of the structure to the size of the structure to be produced. The surface area can also be provided with a structure that is larger than the structure to be produced. Then the material of the substrate is elastically compressed by the application of a compression stress so that the size of the structure is reduced to the size of the structure to be produced. For the coating of the substrate 1, at least one solution is applied to the substrate 1, which contains at least one solid substance dissolved in a solvent. The solvent is then removed from the surface of the substrate 1 so that the solid material remains behind.

The invention claimed is:

1. A method for structuring the surface of a substrate, whereby the substrate is prepared and the material of the substrate is elastically expanded by the application of a tensile stress so that a surface area of the substrate to be structured is enlarged, whereby then at least one solution is applied to the enlarged surface area, which solution contains at least one solid substance dissolved in a solvent, whereby the expansion is then at least partly reversed by reduction or removal of the tensile stress, so that the size of the structure is reduced to the size of the structure to be produced, whereby the solvent is removed from the surface of the substrate so that the solid substance remains behind, wherein said at least one solution is applied to the surface area so as to form, on the surface of the substrate, a plurality of fields arranged in a matrix pattern, further wherein said plurality of fields are separated from one another by spaces, said spaces being free of said at least one solution.

2. A method for structuring the surface of a substrate, whereby the substrate is prepared, and on a surface area of the substrate which is enlarged with respect to a surface area that is to be provided with the structure, at least one solution is applied that contains at least one solid substance dissolved in a solvent, whereby the material of the substrate is elastically compressed by the application of a compression stress so that the size of the surface area on which the solution was applied is reduced to the size of the surface area to be provided with the structure, and whereby the solvent is removed from the surface of the substrate so that the solid remains behind.

3. The method as claimed in claim 1, characterized in that the substrate is realized in the form of a board or film and that the material of the substrate is expanded and/or compressed by central stretching in the plane of extension of the substrate with respect to a center that is preferably approximately in the center of the substrate.

4. The method as claimed in claim 1, characterized in that the material of the substrate is expanded and/or compressed by one-dimensional stretching in the plane of extension of the substrate.

5. The method as claimed in claim 1, characterized in that to produce the structure, at least one biomolecule is applied to the substrate that preferably bonds to the substrate.

6. The method as claimed in claim 1, characterized in that the substrate consists of an optically transparent material.

7. The method as claimed in claim 1, characterized in that the substrate contains at least one elastomer, in particular polypyrrole, polyacetylene and/or polydimethylsiloxane (PDMS).

8. A method for structuring the surface of a substrate, whereby the substrate is prepared and the material of the substrate is elastically expanded by the application of a tensile stress so that a surface area of the substrate to be structured is enlarged, whereby then at least one solution is applied to the enlarged surface area, which solution contains at least one solid substance dissolved in a solvent, whereby the expansion is then at least partly reversed by reduction or removal of the tensile stress, so that the size of the structure is reduced to the size of the structure to be produced, whereby the solvent is removed from the surface of the substrate so that the solid substance remains behind,
wherein the substrate, after the reduction or removal of the tensile stress and/or after the application of the compression stress is applied to a detection device which is preferably integrated in a semiconductor chip, preferably so that the coating areas each cover at least one sensor of the detection device.

9. A method for structuring the surface of a substrate, whereby the substrate is prepared and the material of the substrate is elastically expanded by the application of a tensile stress so that a surface area of the substrate to be structured is enlarged, whereby then at least one solution is applied to the enlarged surface area, which solution contains at least one solid substance dissolved in a solvent, whereby the expansion is then at least partly reversed by reduction or removal of the tensile stress, so that the size of the structure is reduced to the size of the structure to be produced, whereby the solvent is removed from the surface of the substrate so that the solid substance remains behind,
wherein the substrate contains a ceramic material, preferably tetragonal zirconium oxide, magnesium aluminum oxide spinel and/or alpha aluminum oxide.

10. The method as claimed in claim 2, characterized in that the substrate is realized in the form of a board or film and that the material of the substrate is expanded and/or compressed by central stretching in the plane of extension of the substrate radially with respect to a center that is preferably approximately in the center of the substrate.

11. The method as claimed in claim 2, characterized in that the material of the substrate is expanded and/or compressed by one-dimensional stretching in the plane of extension of the substrate.

12. The method as claimed in claim 2, characterized in that the solutions are applied to the surface area so that on the surface of the substrate, a coating is formed that has a plurality of different coating areas arranged next to one another in a matrix.

13. The method as claimed in claim 2, characterized in that to produce the structure, at least one biomolecule is applied to the substrate that preferably bonds to the substrate.

14. The method as claimed in claim 2, characterized in that the substrate consists of an optically transparent material.

15. The method as claimed in claim 2, characterized in that the substrate contains at least one elastomer, in particular polypyrrole, polyacetylene and/or polydimethylsiloxane (PDMS).

16. The method as claimed in claim 2, characterized in that the substrate, after the reduction or removal of the tensile stress and/or after the application of the compression stress is applied to a detection device which is preferably integrated in a semiconductor chip, preferably so that the coating areas each cover at least one sensor of the detection device.

17. The method as claimed in claim 2, characterized in that the substrate contains a ceramic material, preferably tetragonal zirconium oxide, magnesium aluminum oxide spinel and/or alpha aluminum oxide.

\* \* \* \* \*